United States Patent [19]

Harper

[11] Patent Number: 4,934,302
[45] Date of Patent: Jun. 19, 1990

[54] BOAT STORAGE AND TRANSPORTATION APPARATUS

[76] Inventor: Thomas W. Harper, 15422 Triple Creek, San Antonio, Tex. 78247

[21] Appl. No.: 307,351
[22] Filed: Feb. 7, 1989
[51] Int. Cl.⁵ ............................................. B63B 17/00
[52] U.S. Cl. .................................. 114/361; 280/414.1
[58] Field of Search ................................ 114/361, 344; 280/414.1, 414.3; 296/157

[56] References Cited

U.S. PATENT DOCUMENTS

| | | | |
|---|---|---|---|
| 3,107,369 | 10/1963 | Zijstra | 114/361 |
| 3,486,786 | 12/1969 | Howarth | 296/157 |
| 3,909,057 | 9/1975 | Guthry | 280/414.1 |
| 4,223,414 | 9/1980 | Dickson | 114/361 |
| 4,538,952 | 9/1985 | Chase | 280/414.1 X |

*Primary Examiner*—Sherman D. Basinger
*Attorney, Agent, or Firm*—Thomas E. Sisson

[57] ABSTRACT

A combination boat storage and transporatation apparatus having a mobile trailer and a unitary, aerodynamically contoured, rigid cover cantelevered for raising and lowering by hydraulically activated cylinders on either side of the front end of the cover. The cover is supportable in its lowermost position so that it does not contact the exterior surface finish of the boat while at the same time securing against access to property in the interior of the boat. The cylinders are activated by a self-contained power unit secured by a key mechanism.

6 Claims, 2 Drawing Sheets

BOAT STORAGE AND TRANSPORTATION APPARATUS

BACKGROUND OF THE INVENTION

This invention relates to a boat cover, and more specifically to a rigid, aerodynamically contoured high security bass fishing boat cover with a front-end cantelevered lifting mechanism.

U.S. Pat. No. 4,554,884 discloses a trailer, boat, and boat cover combination typical in the field. However, the cover of portion of U.S. Pat. No. 4,554,884 extends only over the open portion of the interior of the boat and further contacts the exterior surface of the boat. Further, such covers of this type are easily removed because they are generally lightweight and attached to the boat by simple clasps.

Another attempt to cover a vehicle is shown in U.S. Pat. No. 3,721,467. In the disclosure of U.S. Pat. No. 3,721,467 a snowmobile, mountable on a trailer, is provided with a fabricated two-piece cover unit having the front portion of the cover inclined upwardly to decrease resistance and to accommodate the windshield of the snowmobile.

Other covers are shown in U.S. Pat. Nos. 3,486,786; 2,669,480; 2,881,023; and 2,847,136.

None of the existing boat covers provide the combination of a high degree of security for property contained within a boat interior without contacting the exterior surface of the boat, the ease and safety of cover removal, and the aerodynamic contoured structure of the present invention.

The present invention is a combination boat storage and transportation trailer having a unitary, aerodynamically contoured cover which does not physically contact the exterior surface of the boat. Existing covers generally contact the boat exterior at least at one point. During transportation of a boat from one location to another, simple vibrations cause slight movements of the cover resulting in rubbing of the cover on the boat's exterior surface and damage to the boat's surface finish. Some have attempted to solve this problem by the installation of a buffer or pad along the contact points, but still unsightly scuffing of the finish occurs. Because the present cover is supported a slight distance away from the boat's exterior surface while still providing a high degree of security to property in the interior of the boat, the present invention is a significant improvement over the prior art.

Further, the cantelever lifting action of the present invention allows a boat to be drawn onto and off of the trailer without any obstruction. Once the boat is off of the trailer, the cover remains on the trailer for ease in removal from the docking site. The use of powerful hydraulic lifting cylinders enables the cover to be of rigid unitary construction and still movable by a single operator using a highly securable, self-contained activation device.

All of the aforementioned and further disclosed advantages make the present apparatus a distinguishable invention over any known prior art.

SUMMARY OF THE INVENTION

Mounted on a mobile trailer is a cantelevered unitary, rigid boat cover. The cover has a smooth, even-flowing exterior contour designed to reduce air resistance over the cover and enclosed boat during transportation of the boat from one location to another. Constructed of lightweight materials such as fiberglass or high strength plastic over a rigid aluminum frame, the unitary cover is raised or lowered by the activation of hydraulic cylinders attached to both sides of the front end of the cover. In its lowermost position over a boat mounted on the trailer, the cover rests upon two support arms extending upwardly from the rear end of each side of the trailer—the cover not contacting the exterior of the boat's surface. Access to the interior of the boat is restricted when the cover is in its lowermost position. The boat may be drawn onto or off of the trailer without obstruction when the cover is in its raised position.

BRIEF DESCRIPTION OF THE DRAWINGS

Reference herein is made to the following drawings, but it is understood that slight modifications thereto do not depart from the scope of the invention.

DETAILED DESCRIPTION OF THE PREFERRED EMBODIMENT

Figure 1:
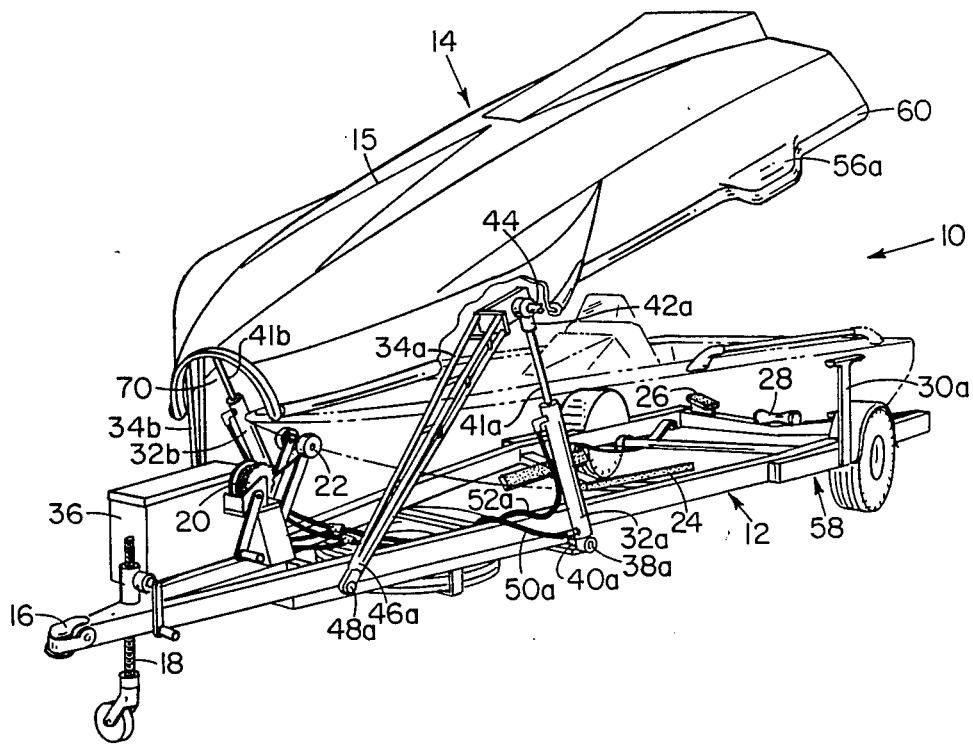
FIG. 1 is a left front perspective view of the invention with the cover raised showing a cutaway at the cantelever joint and a boat in dotted lines.

FIG. 1 illustrates the present invention 10 having a mobile trailer 12 and a cantelevered rigid cover 14 of unitary construction. Trailer 12 is a conventional boat trailer with hitch 16, adjustable front wheel 18, winch 20, boat bow mount 22, boat keel support 24, boat stern support 26, and docking roller 28. Trailer 12 is equipped with cantelevered cover 14, cover rear supports 30a (FIG. 1) and 30b (FIG. 2), hydraulic cylinders 32a and 32b, pivot arms 34a and 34b, and power unit housing 36. FIG. 3, like FIG. 1, illustrates the cover 14 in a raised position.

Cover 14 is constructed of lightweight materials such as fiberglass or high strength plastics. Rigidity of shape and structural strength is maintained by a lightweight, high strength metal framework (not shown) upon which cover shell 15 is overlaid. While it is desired that cove 14 not be excessively heavy, the weight of the present cover is greater than many prior art covers. However, since the raising and lowering of the present cover is accomplished by means of powerful hydraulic cylinders 32a and 32b, rather than by hand, the greater weight of cover 14 contributes to the advantages of the present invention as will be discussed below. The aerodynamically contoured shape of cover 14 more than compensates for any additional weight which must be pulled by the prime mover.

Two hydraulic cylinders 32a and 32b are pivotally attached at first ends 38a and 38b to opposite sides of trailer 12 by means of frame extensions 40a and 40b which extend outwardly from the front end of trailer 12. The rod ends 42a and 42b of cylinders 32a and 32b, respectively, are pivotally attached to opposite sides of cover 14 through upper pivot arm extension lug 44 which extends outwardly from the upper end of pivot arms 34a and 34b.

The lower ends 46a and 46b of pivot arms 34a and 34b are pivotally connected to opposite sides of trailer 12, forward of frame extensions 40a and 40b, on pivot arm frame extensions 48a and 48b. Pivot arms 34a and 34b are rigid and of sufficient structural strength to accommodate the forces and tensions exerted upon the extension of hydraulic cylinder rods 41a and 41b during the raising and lowering of cover 14.

Because cylinders 32a and 32b and pivot arms 34a and 34b are positioned on the front end of trailer 12 and the front end of cover 14, cover 14 is cantelevered above the middle and rear portions of trailer 12. This cantelevering allows for the unobstructed loading and unloading of a boat onto or off of trailer 12. When cylinder rods 41a and 41b are extended, cover 14 is raised approximately 10 feet above a boat on the trailer and approximately 13 feet above the trailer itself.

Extension or retraction of rods 41a and 41b is accomplished by using a conventional electrically activated hydraulic pump (with reservoir) connected to an electrical power source with the pump connected to the cylinders by hydraulic fluid lines. In the present invention, the electrical power source (a 12 volt wet cell battery), the hydraulic pump with reservoir, and the power switches (a key activated on/off switch with remote spring-loaded push buttons for raise and lower functions) are housed in lockable power unit housing 36 affixed to the forwardmost end of trailer 12.

Thus, in operation, the operator must unlock housing 36, insert a key in the on/off switch, and then may raise or lower cover 14 by depressing the raise or lower push button. Other suitable means of activating the cylinders may be utilized which provide the operator with a method for securing access to the power unit and for requiring positive, safe activation of the raise and lower functions.

Figure 2:
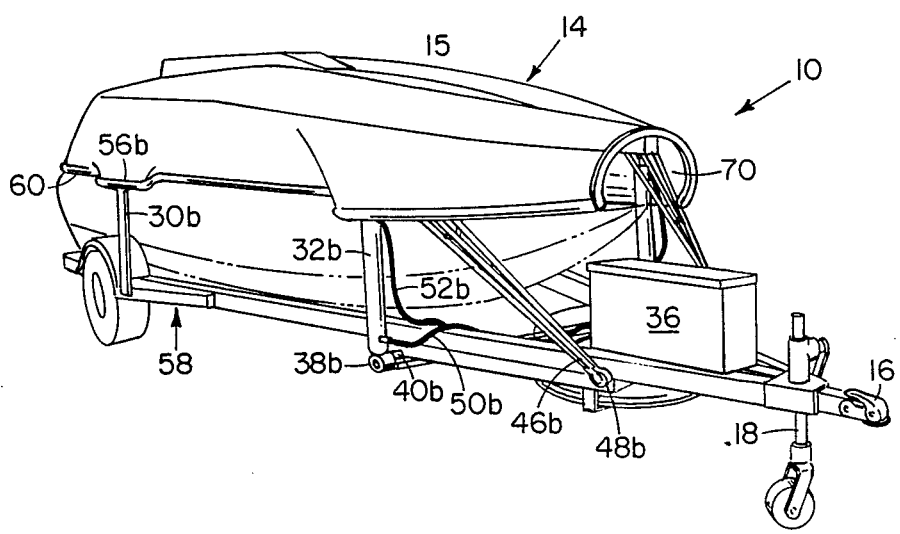
FIG. 2 is a right front perspective view of the invention with the cover in its lowermost position, and a boat shown in dotted lines.
Figure 3:
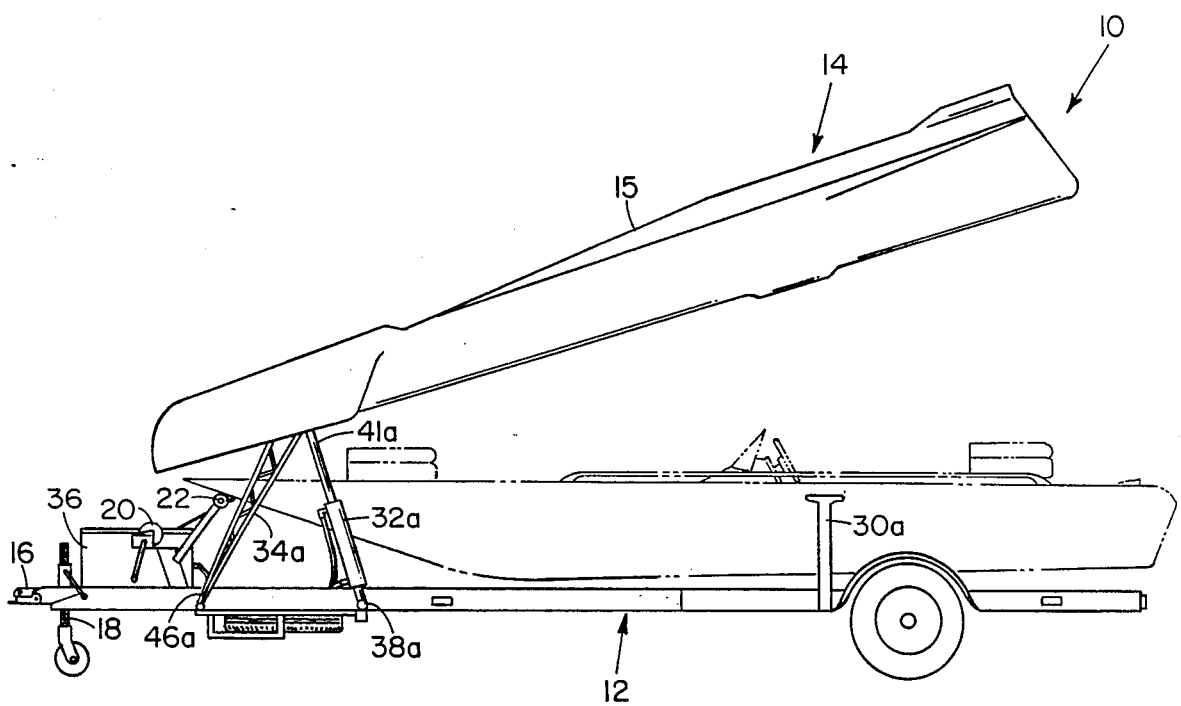
FIG. 3 is a side elevation view of the present invention with the cover raised and a boat shown in dotted lines.
Figure 4:
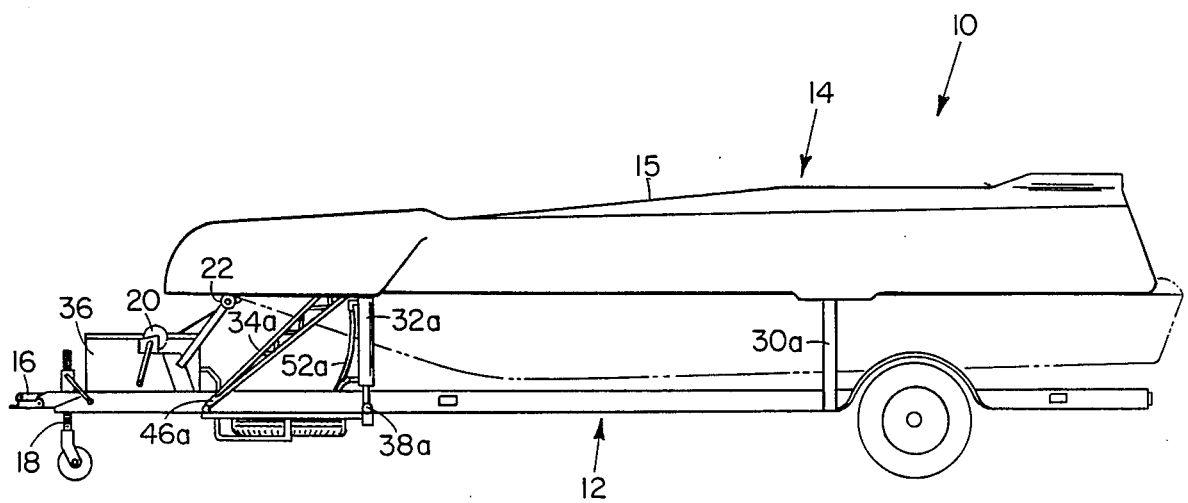
FIG. 4 is a side elevation view of the present invention with the cover lowered and a boat shown in dotted lines.

Turning now to FIGS. 2 and 4, cover 14 is illustrated in its lowermost position. This is the position the cover would be in during transit whether or not a boat is mounted on the trailer. As can be seen, the cover and lifting mechanisms are easily transported and stored even when the boat is removed.

In its lowermost position, cover 14 is supported on its rear support mounting members 56a and 56b by rear cover supports 30a and 30b attached to and extending upwardly from the rear end 58 of trailer 12. Cover 14's outer periphery 60 is slightly wider than the width of the boat and, therefore, does not contact the outer surface of the boat. However, when cover 14 is in its lowermost position, there is insufficient space between the outer surface of the boat and cover 14 to allow one access to the interior of the boat.

Further, because of the weight of the cover 14 and the need to activate raising and lowering cylinders 32a and 32b, a high degree of security to property inside of the boat is achieved. When the cover 14 is thus lowered, the operator can be confident that he may leave the boat unattended without being concerned that unauthorized personnel will gain access to the interior of the boat.

The preferred embodiment of the present invention is utilized with the modern, low profile bass fishing boat. Such boats often have bow-mounted trolling motors with shafts and prop extensions which extend beyond the tip of the boat's bow. As can be seen in FIGS. 1 and 2, a small opening 70 of substantially u-shape may be formed into the forwardmost position of cover 14. This opening facilitates the extension of the shaft and prop extensions of the trolling motor forward the bow of the boat. The opening 70 is sufficiently small enough to ensure that there cannot be unauthorized access to the interior of the boat. In the preferred embodiment, the forwardmost end of cover 14 is closed as shown in FIGS. 3 and 4, but extends over the trolling motor shaft and prop member. The closed end is smoothly contoured to reduce air resistance.

While the invention has been described in connection with a preferred embodiment, it is not intended to limit the invention to the particular form set forth, but, on the contrary, it is intended to cover alternatives, modifications, and equivalents, as may be included within the spirit and scope of the invention as defined by the appended claims.

I claim:

1. A storage and transportation apparatus for a boat comprising:
   a mobile trailer;
   a unitary, aerodynamically contoured, rigid cover, said rigid cover having a forwardmost end and a substantially u-shaped opening in said forwardmost end of said cover;
   a hydraulically activated means for cantelevered raising and lowering of said cover, said raising and lowering means attached to a front end portion of said cover and to a front end portion of said trailer, said cover supported at a rear end portion on a means for support attached to a rear end portion of said trailer when said cover is in a lowermost position; and
   a means for activating said raising and lowering means, said activating means attached to said trailer and securable against unauthorized activation.

2. The invention of claim 1 wherein said raising and lowering means comprises a first and a second hydraulic cylinder with hydraulic fluid lines attached to said activating means, said first cylinder mounted on a first side of said front end of said trailer and further attached to a first side of said front end portion of said cover.

3. The invention of claim 2 wherein said activating means comprises:
   a lockable housing;
   a storage battery within said housing;
   a key operated activation switch within said housing for activating a hydraulic pump within said housing, said pump operable upon the activation of a spring-loaded on-off switch.

4. The invention of claim 1 wherein said cover covers all access areas to the interior of said boat without contacting the exterior surface of said boat.

5. The invention of claim 4 wherein said cover further extends over the front end of said boat to over the rear end of said boat, covering all said access areas to said interior of said boat except for said small opening at said forwardmost end of said cover for the extension therefrom of a portion of a trolling motor member.

6. A storage and transportation apparatus for a boat comprising:
   a mobile trailer;
   a unitary, aerodynamically contoured, rigid cover;
   a hydraulically activated means for cantelevered raising and lowering of said cover, said raising and lowering means attached to a front end portion of said cover and to a front end portion of said trailer, said cover supported at a rear end portion on a means for support attached to a rear end portion of said trailer when said cover is in a lowermost position, said raising and lowering means further comprising:

first and second hydraulic cylinders pivotally attached at first ends to opposite sides of said trailer and pivotally attached at rod ends to opposite sides of said cover;

first and second pivot arms pivotally attached at lower ends to opposite sides of said trailer forward said hydraulic cylinders and pivotally attached at upper ends to opposite sides of said cover at substantially the same location where said rod ends of said cylinders attach to said cover; and a means for activating said raising and lowering means, said activating means attached to said trailer, and securable against unauthorized activation.

* * * * *